(12) United States Patent
Satnur et al.

(10) Patent No.: US 10,120,618 B2
(45) Date of Patent: Nov. 6, 2018

(54) SYSTEMS AND METHODS FOR ADAPTIVE OFFLOADING OF MASS STORAGE DATA MOVEMENT

(71) Applicant: VMWARE, INC., Palo Alto, CA (US)

(72) Inventors: Sunil Satnur, Palo Alto, CA (US); Prasanna Aithal, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 692 days.

(21) Appl. No.: 14/461,454

(22) Filed: Aug. 18, 2014

(65) Prior Publication Data
US 2015/0370492 A1    Dec. 24, 2015

(30) Foreign Application Priority Data
Jun. 24, 2014   (IN) .......................... 3071/CHE/2014

(51) Int. Cl.
*G06F 3/06* (2006.01)
(52) U.S. Cl.
CPC ............ *G06F 3/0689* (2013.01); *G06F 3/061* (2013.01); *G06F 3/067* (2013.01); *G06F 3/0659* (2013.01); *G06F 2003/0692* (2013.01)

(58) Field of Classification Search
CPC ............. G06F 2003/0692; G06F 3/061; G06F 3/0659; G06F 3/067; G06F 3/0689
See application file for complete search history.

(56) References Cited

U.S. PATENT DOCUMENTS

2003/0159058 A1*  8/2003  Eguchi .................. G06F 3/0622
                                                          713/193

\* cited by examiner

*Primary Examiner* — Yong Choe
(74) *Attorney, Agent, or Firm* — Fish & Richardson P.C.

(57) ABSTRACT

A method for adaptive offloading of data movement from a computer system includes identifying performance results from a plurality of SCSI extended copy (XCOPY) operations associated with a storage unit, each XCOPY operation of the plurality of XCOPY operations including one or more parameters. The method also includes selecting, based on the identified performance results, one or more XCOPY parameters for the storage unit from the plurality of XCOPY operations. The method further includes forming an XCOPY operation associated with the storage unit, the XCOPY operation including the one or more selected XCOPY parameters. The method also includes transmitting the XCOPY operation to the storage unit.

27 Claims, 6 Drawing Sheets

SYSTEMS AND METHODS FOR ADAPTIVE OFFLOADING OF MASS STORAGE DATA MOVEMENT

RELATED APPLICATION

Benefit is claimed under 35 U.S.C. 119(a)-(d) to Foreign application Serial No 3071/CHE/2014 filed in India entitled "SYSTEMS AND METHODS FOR ADAPTIVE OFFLOADING OF MASS STORAGE DATA MOVEMENT", filed on Jun. 24, 2014, by VMware, Inc., which is herein incorporated in its entirety by reference for all purposes.

BACKGROUND

This disclosure relates generally to data movement on storage devices and, more specifically, to systems and methods for adaptively offloading data movement operations from a client computer device to an attached storage system.

Enterprise storage systems employ disk arrays that are physically independent enclosures containing a disk array controller, a disk cache, and multiple physical disk drives. The disk array controller manages the physical disk drives and exposes them to connected computer systems as logical data storage units, each identified by a logical unit number (LUN), and enable storage operations such as cloning, snapshotting, mirroring, and replication to be carried out on the data storage units using storage hardware.

Computer systems that employ disk arrays are typically configured with a file system (e.g., at the disk drive level) in tandem with a logical volume manager (e.g., at a higher level, typically by the computer system). The logical volume manager is a software or firmware component that organizes a plurality of data storage units into a logical volume, which may be a collection of several physical partitions or sections of a disk. The logical volume is available in the form of a logical device With a contiguous address space on which individual files of a file system are laid out. The mapping of the logical volume to the data storage units is controlled by the computer system and, as a result, disk arrays may not know how individual files are laid out on the data storage units. Therefore, a disk array cannot invoke its hardware to carry out storage operations such as cloning, snapshotting, mirroring, and replication on a per-file basis.

A conventional solution for carrying out storage operations in a disk array on a per-file basis is to add storage metadata in data structures managed by the disk array. Disk arrays, however, are provided by a number of different vendors and storage metadata varies by vendor. This solution is not attractive because the file system would then need to be customized for each different vendor. For this reason, storage operations such as cloning, snapshotting, mirroring, and replication of files have been typically carried out using software techniques using through traditional standard file system calls.

BRIEF DESCRIPTION OF THE DRAWINGS

FIGS. 1A-5 illustrate example embodiments of the methods and systems described herein.

FIG. 1A is a functional block diagram of a virtualized computer system topology in which the adaptive offloading of mass storage data movement may be practiced.

FIG. 2 is a functional block diagram of a virtualized computer system with a connected storage system, in which the adaptive offloading of mass storage data movement may be practiced.

FIG. 3 is a conceptual diagram that illustrates a mapping of a file in the computer system of FIG. 2 to data storage units and physical storage locations in a storage system.

FIG. 4 is a conceptual diagram that shows an I/O management system that may be used to adaptively offload storage data movement operations from a computer system similar to the computer systems shown in FIGS. 1A-3 to a storage system similar to the storage systems shown in FIGS. 1A-3.

FIG. 5 is a flow diagram of an example method for adaptively offloading storage data movement operations from a computer system similar to the computer systems shown in FIG. 4 to a storage system similar to the storage systems shown in FIG. 4.

In the figures, like reference numbers indicate identical or functionally similar elements. Also in the figures, the left most digit of each reference number corresponds to the figure in which the reference number is first used.

DETAILED DESCRIPTION

Systems and methods described herein facilitate adaptive offloading certain aspects of copy operations from a client device (e.g., a virtual machine (VM) or an underlying server system supporting VMs) to a storage device (e.g. a direct-attached disk drive or a network-attached storage array that includes a plurality of disk drives). More specifically, the systems and methods described herein facilitate adaptive offloading of data relocation operations to a storage device through the use of the small computer systems interface (SCSI) extended copy (XCOPY) command. The client device manages replication and/or relocation of data during situations such as, for example, cloning of data or movement of data from one logical unit number (FUN) to another. This system uses XCOPY operations to offload the reading and writing operations associated with replication or copying. Further, this system alters the content and/or parameters of XCOPY operations based on historical data collected from XCOPY operations for a given storage device, or for a particular LUN (i.e., a logical region of storage or physical storage device presented to the client device froth the storage device).

In one example embodiment, this system resides on the client device and submits XCOPY operations to one or more LUNs served by the storage device. The system collects performance information from the XCOPY operations and analyzes this performance information to determine performance characteristics and limitations of the storage device. This analysis information is then used during later XCOPY operations to improve performance of the storage device and/or reduce administrative burden on the client device.

The following detailed description illustrates embodiments of the disclosure by way of example and not by way of limitation. It is contemplated that the disclosure has general application to storage operations for VMs and virtual machine infrastructures.

Figure 1A:
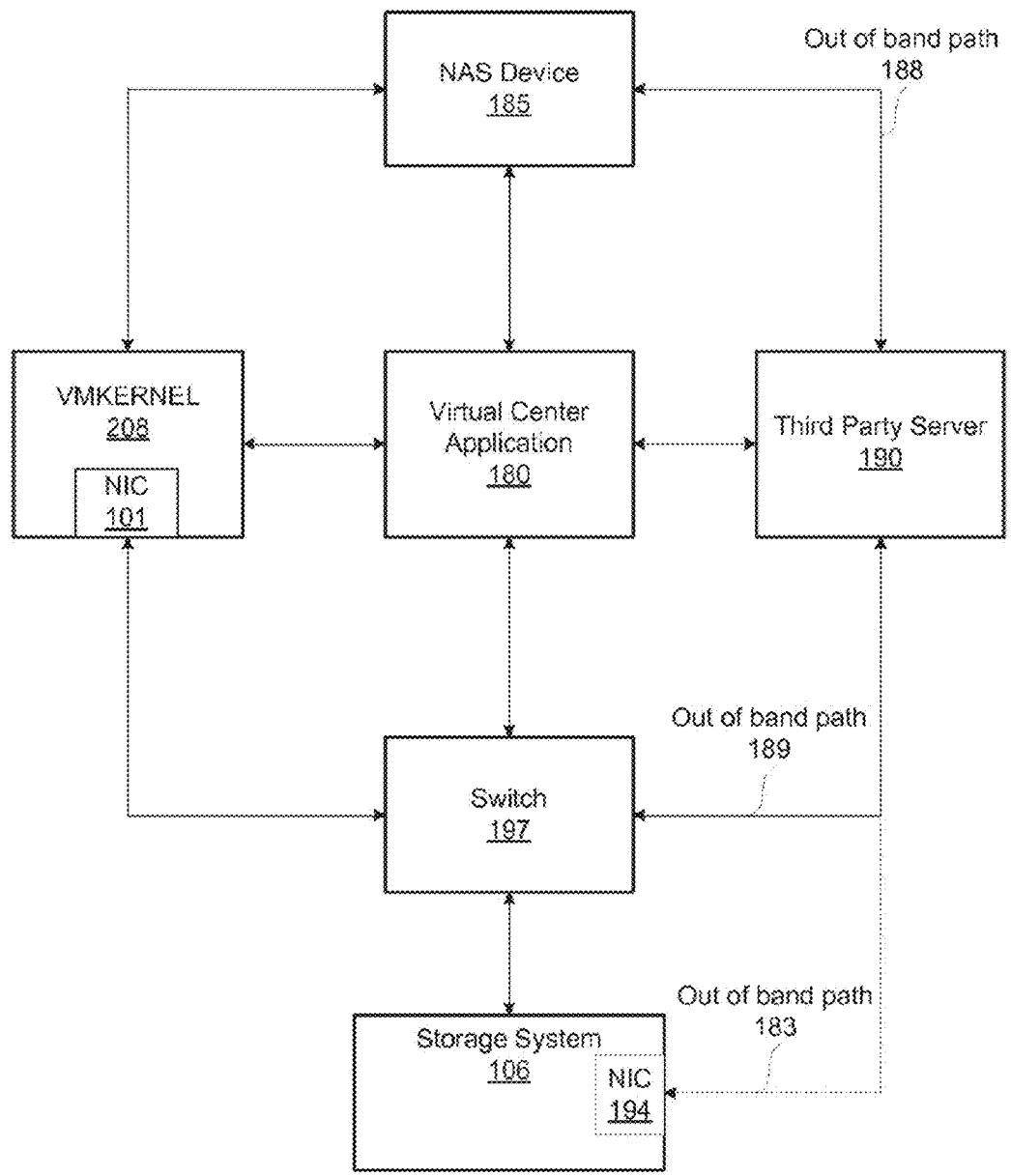

FIG. 1A is a functional block diagram of a virtualized computer system topology in which the adaptive offloading of mass storage data movement may be practiced. A computer system may include VMkernel 208 and virtual center application 180. VMkernel 208 may be a VMware ESX Server that includes a storage stack with a virtual machine file system (VMFS) running on a server machine. In accordance with one or more such embodiments, virtual center application 180 is an application that manages one or more VMkernels 208, and runs on a server machine. As shown in FIG. 1A, virtual center application 180 is coupled between VMkernel 208 and a third party server 190 to provide out of band paths 188, 189, and 183 from VMkernel 208 to storage devices, e.g., network attached storage (NAS) device 185 and storage system 106 (e.g., a disk array). As shown in FIG. 1A, switch 197 is coupled between storage system 106, virtual center application 180, VMkernel 208, and third party server 190. In accordance with one or more embodiments of the present disclosure, switch 197 is a switching device that contains: (a) a fast interconnect and data path processor to switch packets; and (b) some control path processors to provide I/O packet switching and fabric virtualization services.

In some embodiments, switch 197 is omitted, storage system 106 resides in a separate data center from third party server 190, and third party server 190 communicates with storage system 106 via out of band path 183 and a network interface card ("NIC") 194 installed in storage system 106. In accordance with one or more further embodiments, additional switches 197 and storage systems 106 may be included in a system with one or more storage systems 106 residing in different data centers.

Figure 1B:
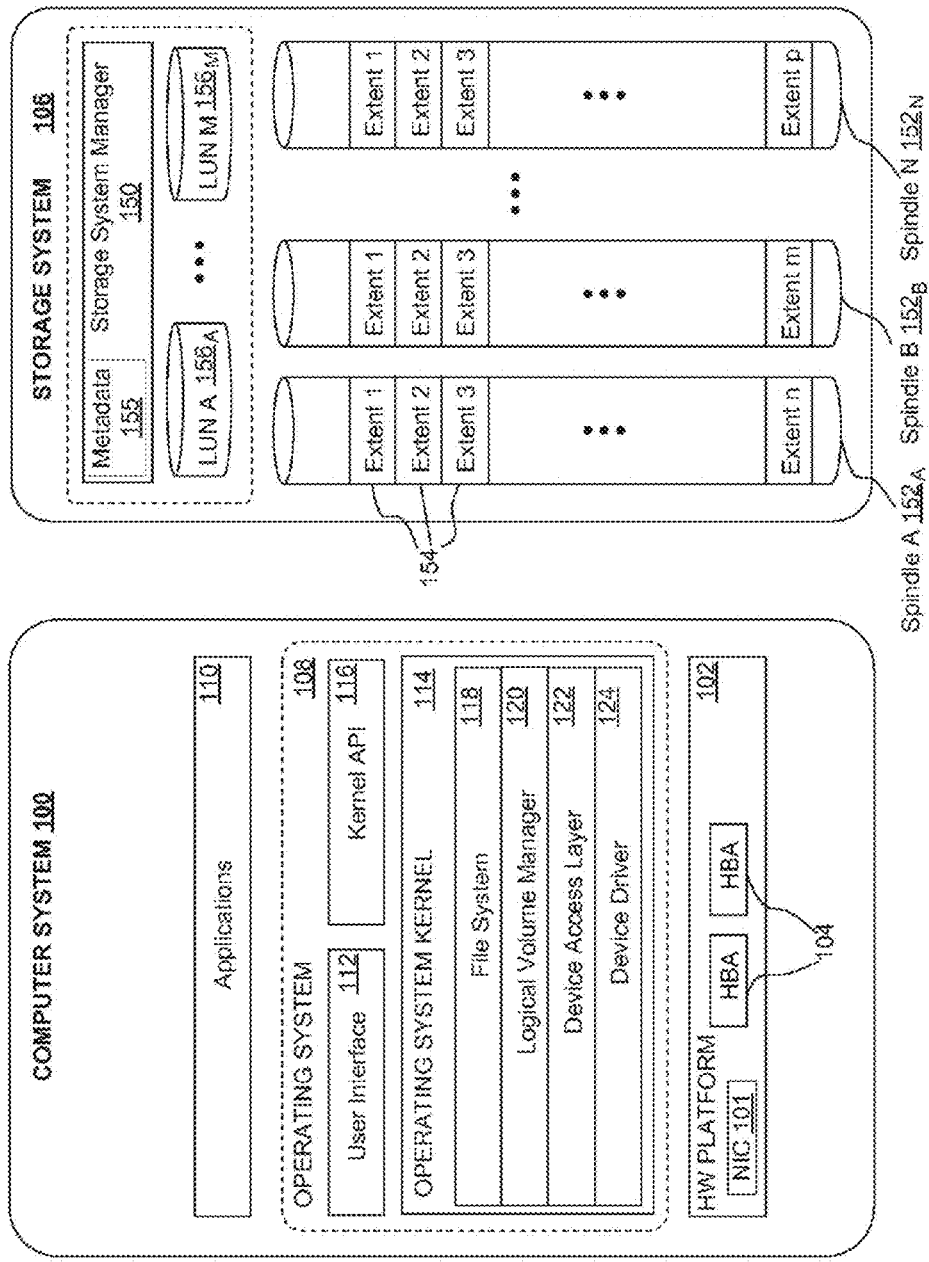
FIG. 1B is a functional block diagram of a computer system with a connected storage system, in which the adaptive offloading of mass storage data movement may be practiced.

FIG. 1B is a functional block diagram of a computer system with a connected storage system, in Which the adaptive offloading of mass storage data Movement may be practiced. Computer system 100 may be constructed on a conventional, typically server-class, hardware platform 102. As shown in FIG. 1B, computer system 100 includes host bus adapters (HBA) 104 that enable computer system 100 to connect to storage system 106. Examples of storage systems 106 may be a network attached storage (NAS) device, storage area network (SAN) arrays, or any other similar disk arrays known to those with ordinary skill in the art. A storage system 106 that is a NAS device may be connected to computer system 100 through NIC 101. As further discussed below, disk arrays, such as SAN arrays, may typically provide block-level access to their storage through SCSI-based protocols such as Fibre Channel and iSCSI. Those with ordinary skill in the art will recognize that enterprise-level implementations of the foregoing may have multiple computer systems similar to computer system 100 that may be connected through various different known topologies and technologies (e.g., switches, etc.) to multiple storage systems 106.

In storage system 106, storage system manager 150, which represents one or more programmed storage processors, serves as a communication agent (to the outside world) for storage system 106, and implements a virtualization of physical, typically disk drive-based storage units, referred to in FIG. 1B as spindles $152_A$-$152_N$, that reside in storage system 106. Spindles $152_A$-$152_N$ are collectively referred to herein as spindles 152. Further, the term "spindle," though historically used to refer to a conventional hard disk drive with rotating platters, is used generally and inclusively herein to refer to any non-volatile data storage device such as, for example, solid-state drives. From a logical perspective, each of these spindles can be thought of as a sequential array of fixed sized extents 154. Storage system manager 150 abstracts away complexities of targeting read and write operations to addresses of the actual spindles and extents of the disk drives by exposing to computer system 100 an ability to view the aggregate physical storage space provided by the disk drives as a contiguous logical storage space that may be divided into a set of virtual SCSI devices known as LUNs (i.e., separate logical Units) $156_A$-$156_M$. The virtualization of spindles $152_A$-$152_N$ into such a contiguous logical storage space of LUNs $156_A$-$156_M$ can provide a more efficient utilization of the aggregate physical storage space that is represented by an address space of a logical volume: Storage system manager 150 exposes to computer system 100 an ability to transmit data transfer and control operations to storage system 106 at a "LUN block" level, where a LUN block is a particular contiguous region in a particular LUN. For example, a LUN block may be identified and/or represented as a tuple, <LUN ID, offset, length>, and computer system 100 may transmit to storage system 106 a read, write, or XCOPY for a block (e.g., identified by the tuple <LUN ID, offset, length>) in the form of a SCSI operation. The LUN identifier (LUN ID) is a unique, hardware independent, SCSI protocol compliant identifier value that is retrievable in response to a standard SCSI Inquiry command.

Storage system manager 150 maintains metadata 155 that includes a mapping (hereinafter, also referred to as an extent-mapping) for each of LUNs $156_A$-$156_M$ to an ordered list of extents, wherein each such extent can he identified as a spindle-extent pair <spindle#, extent#> and may therefore be located in any of the various spindles $152_A$-$152_N$. As such, whenever storage system manager 150 receives a LUN block operation from computer system 100, it is able to utilize the extent-map of the LUN to resolve the block into an appropriate list of extents located in various spindles $152_A$-$152_N$ upon which the operation is performed. Those with ordinary skill in the art will recognize that, while specific storage system manager implementation details and terminology may differ as between different storage device manufacturers, the desired consistent result is that the externally visible LUNs implement the expected semantics (in this example, SCSI semantics) needed to respond to and complete initiated transactions.

When storage system 106 is an NAS device (e.g., supporting block-based I/O and iSCSI), storage system manager 150 exposes to computer system 100 an ability to transmit data transfer and control operations to storage system 106 at the file level. In contrast with SAN storage, LUNs $156_A$-$156_M$ are managed within the NAS device. Storage system manager 150 manipulates files (performs I/O for files using block addresses, change file length and attributes, and the like) stored on the NAS device using file handles. When storage system manager 150 receives file operation from computer system 100, it finds the location of the files being operated on within spindles $152_A$-$152_N$ using the filehandle specified by the file operation and performs the operation.

Returning to computer system 100, operating system 108 is installed on top of hardware platform 102 and it supports execution of applications 110. Examples of operating system 108 may be Microsoft Windows®, Linux®, Netware®-based operating systems or any other operating system known to those with ordinary skill in the art. Users may interact with computer system 100 through a user interface 112 such as a graphical user interface or a command based shell, while executing applications 110 may access computing resources of computer system 100 that are managed by operating system kernel 114 through kernel application programming interface (API) 116. Kernel 114 provides process, memory and device management to enable various executing applications 110 to share limited resources of computer system 100. For example, file system calls initiated by applications 110 through kernel API 116 are routed to file system 118. File system 118, in turn, converts the file system operations to LUN block operations, and provides the LUN block operations to logical volume manager 120. File system 118, in general, manages creation, use, and deletion of files stored on storage system 106 through the LUN abstraction discussed previously. Logical volume manager 120 translates the volume block operations for execution by storage system 106, and issues raw SCSI operations (or operations from any other appropriate hardware connection interface standard protocol known to those with ordinary skill in the art, including IDE, ATA, and ATAPI) to device access layer 122 based on the LUN block operations. Device access layer 122 discovers storage system 106, and applies command queuing and scheduling policies to the raw SCSI operations. Device driver 124 understands the input/output interface of HBAs 104 interfacing with storage system 106, and sends the raw SCSI operations from device access layer 122 to HBAs 104 to be forwarded to storage system 106. As previously discussed, storage system manager 150 of storage system 106 receives the raw SCSI operations e.g., LUN block level operations), and resolves them into the appropriate extents within the spindles of the disk array that are operated upon.

Instances arise during the operation of computer system 100 where files on file system 118 cannot ultimately be stored in contiguous blocks of LUNs $156_A$-$156_M$ presented to computer system 100 by storage system 106, While there may be enough blocks of free Storage space in the aggregate among various LUNs $156_A$-$156_M$ to store such files, such blocks are neither large enough nor contiguous and may be dispersed across different LUNs. In such instances, files may need to be segmented into multiple component parts at the file system level, LUN level, and the spindle-extent level (as further detailed in FIG. 3), such that the file components are stored across different blocks of different LUNs. Due to this segmentation, operations on such files, such as read and write operations, also need to be broken up into separate block level LUN operations (i.e., raw LUN block level SCSI operations) when transmitted to storage system 106 thereby increasing the resources used by computer system 100 to communicate with storage system 106 (e.g., CPU cycles, DMA buffers, SCSI commands in the HBA queue, etc.).

Figure 2:
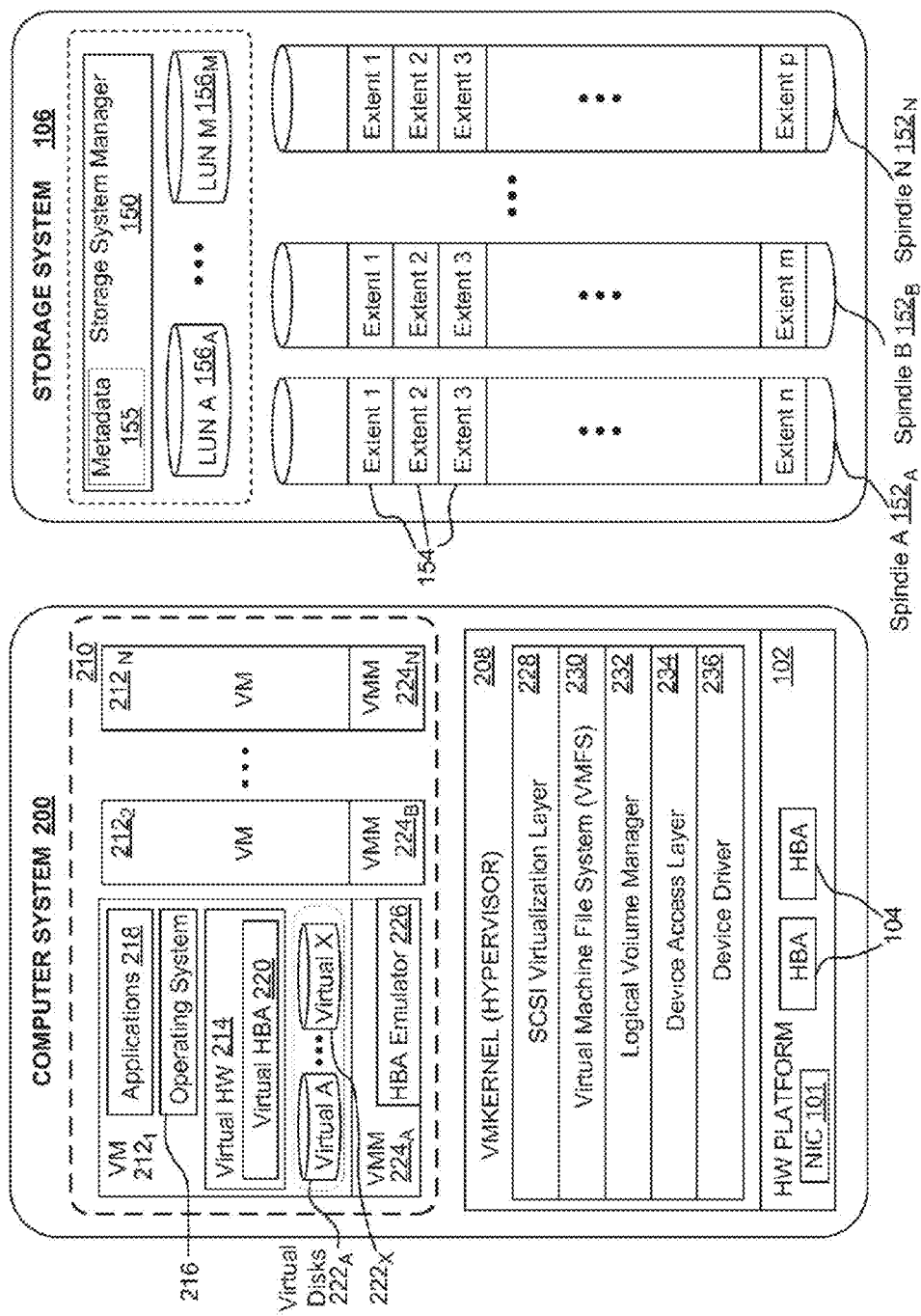

One example of an environment that deals with significantly large files or collections of files where the foregoing segmentation may occur is server virtualization. As further discussed below, virtualization systems expose the concept of a "virtual disk" which is implemented as a collection of files stored on a file system. FIG. 2 is a functional block diagram of a virtualized computer system with a connected storage system, in which the adaptive offloading of mass storage data movement may be practiced. Similar to computer system 100 of FIG. 1B computer system 200 may be constructed on a conventional, typically server-class, hardware platform 102. As shown in FIG. 2, computer system 200 includes HBAs 104 and NIC 101 that enable computer system 200 to connect to storage system 106. As further shown in FIG. 2, virtual machine operating system (VMkernel) 208 is installed on top of hardware platform 102 and it supports virtual machine execution space 210 within which multiple VMs $211_1$-$211_N$ may be concurrently instantiated and executed. Each such VM $211_1$-$211_N$ implements a virtual hardware platform 214 that supports the installation of a guest operating system 216 which is capable of executing applications 218. Similar to operating system 108 of FIG. 1B examples of a guest operating system 216 may be Microsoft Windows®, Linux®, Netware®-based operating systems or any other operating system known to those with ordinary skill in the art. In each instance, guest operating system 216 includes a native file system layer (not shown), for example, either an NITS or an ext3FS type file system layer. These file system layers interface With virtual hardware platforms 214 to access, from the perspective of guest operating systems 216, a data storage MBA, Which in reality, is virtual HBA 220 implemented by virtual hardware platform 214 that provides the appearance of disk storage support (in reality, virtual disks or virtual disks $222_A$-$222_X$) to enable execution of guest operating system 216 transparent to the virtualization of the system hardware. Virtual disks $222_A$-$222_X$ may appear to support, from the perspective of guest operating system 216, the SCSI standard for connecting to the VM or any other appropriate hardware connection interface standard known to those with ordinary skill in the art, including IDE, ATA, and ATAPI.

Although, from the perspective of guest operating systems 216, file system calls initiated by such guest operating systems 216 to implement file system-related data transfer and control operations appear to be routed to virtual disks $222_A$-$222_X$ for final execution, in reality, such calls are processed and passed through virtual HBA 220 to adjunct virtual machine monitor (VMM) layers $224_A$-$224_N$ that implement the virtual system support needed to coordinate operation with VMkernel 208. In particular, host bus emulator 226 functionally enables the data transfer and control operations to be correctly handled by VMkernel 208 which ultimately passes such operations through its various layers to true HBAs 104 or NIC 101 that connect to storage system 106. Assuming a SCSI supported virtual device implementation (although those with ordinary skill in the art will recognize the option of using other hardware interface standards), SCSI virtualization layer 228 of VMkernel 208 receives a data transfer and control operation (in the form of SCSI commands) from VMM layers $224_1$-$224_N$, and converts them into file system operations that are understood by VMFS 230. SCSI virtualization layer 228 then issues these file system operations to VMFS 230. VMFS, in turn, converts the file system operations to volume block operations, and provides the volume block operations to logical volume manager 232. Logical volume manager (LVM) 232 is typically implemented as an intermediate layer between the driver and conventional operating system file system layers, and supports volume oriented virtualization and management of the LUNs accessible through HBAs 104 and NIC 101. As previously described, multiple LUNs, such as LUNs $156_A$-$156_M$ can be gathered and managed together as a volume under the control of logical volume manager 232 for presentation to and use by VMFS 230 as an integral LUN.

VMFS 230, in general, manages creation, use, and deletion of files stored on storage system 106 through the LUN abstraction discussed previously. One example of a clustered file systems, such as VMFS 230, is described in patent application Ser. No. 10/773,613that is titled, "MULTIPLE CONCURRENT ACCESS TO A FILE SYSTEM" filed Feb. 4, 2004. Logical volume manager 232 issues raw SCSI operations to device access layer 234 based on the LUN block operations. Device access layer 234 discovers storage system 106, and applies command queuing and scheduling policies to the raw SCSI operations. Device driver 236 understands the input/output interface of HBAs 104 and NIC 101 interfacing with storage system 106, and sends the raw SCSI operations from device access layer 234 to HBAs 104 or NIC 101 to be forwarded to storage system 106. As previously discussed, storage system manager 150 of storage system 106 receives the raw SCSI operations (i.e., LUN block level operations) and resolves them into the appropriate extents within the spindles of the disk array that are operated upon.

As used herein, the terms "data storage unit" and/or "storage unit" may be used to refer to either a storage array (e.g., storage system) or to a physical or logical storage device (e.g., LUN) presented by a storage array.

Figure 3:
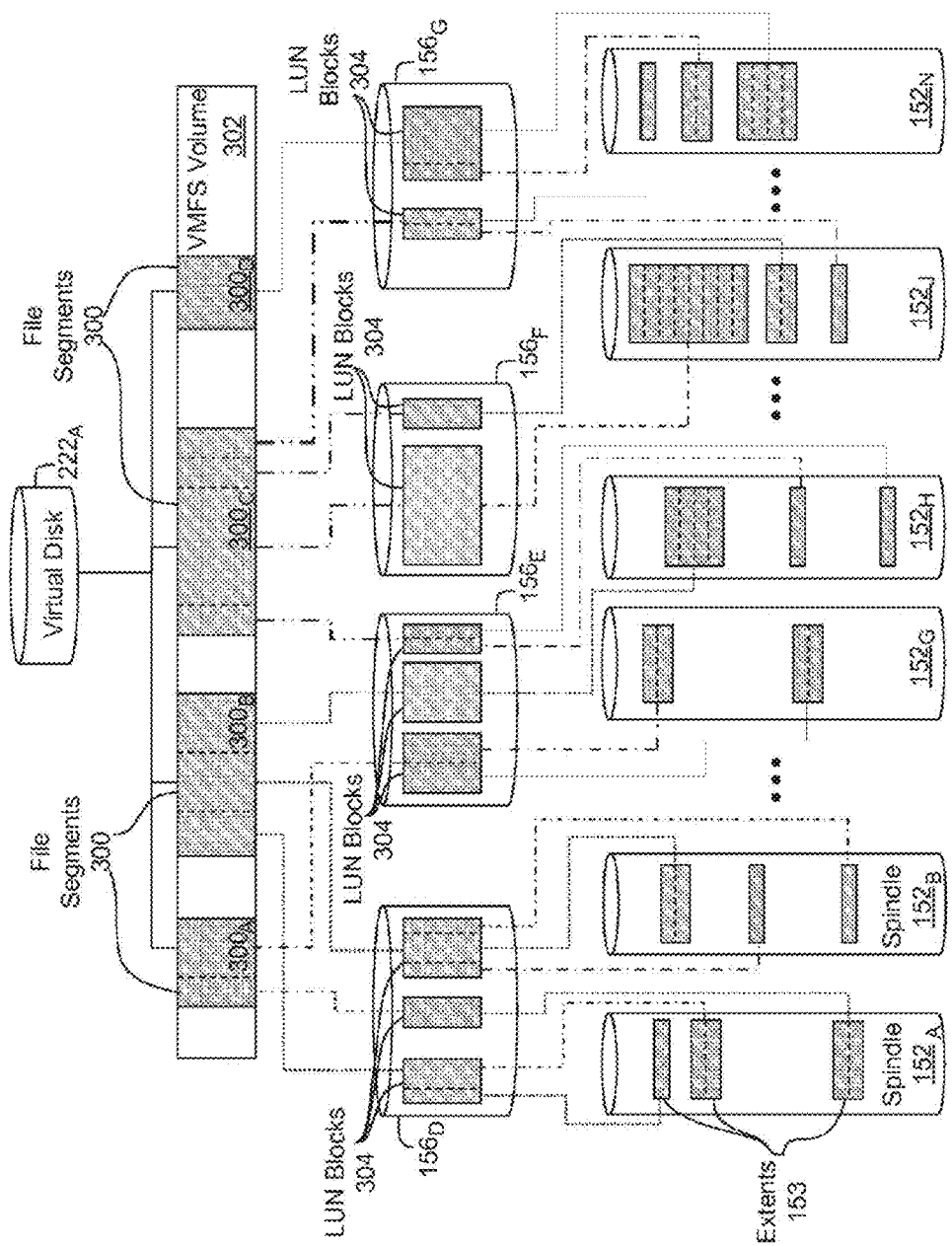

FIG. 3 is a conceptual diagram that illustrates a mapping of a file in the computer system of FIG. 2 to data storage units and physical storage locations in a storage system. As FIG. 3 depicts, virtual disk $222_A$ is stored as a file on the file system managed by VMFS 230. For simplicity, the description that follows will assume that the virtual disk is made out of a single file. However, the description is just as applicable to virtual disks containing multiple files. Further, one or more embodiments of the disclosure are applicable to not only one or more files but also to a file segment that is stored in non-adjacent locations of the same LUN or across different LUNs.

The virtual LUN file is allocated by VMFS 230 as a series of segments $300_A$-$300_D$ in logical address space, VMFS volume 302, that is managed by VMFS 230. Each segment $300_A$-$300_D$, is a contiguous region in VMFS volume 302, where VMFS 302 has been constructed by an administrator of the system by allocating a set of LUNs $156_D$-$156_G$ available from storage system's 106 set of LUNs $156_A$-$156_M$. As previously discussed in the context of FIGS. 1B and 2, each contiguous region, of a file segment that is also contiguous on one of the allocated LUNS, is considered a "LUN block" 304 that can be represented as <LUN ID, offset, length>. As shown in FIG. 3, different LUN blocks 304 corresponding to a portion of a file segment may be of different lengths depending on how big the file segment is and what part of that file segment actually corresponds to a contiguous region of an allocated LUN. Therefore, a file may have one or more segments, and a segment may be composed of one or more LUN blocks from one or more LUNs. In the illustrated example, file segment $300_A$ has 2 LUN blocks, file segment $300_B$ has 3 LUN blocks, file segment $300_C$ has 4 LUN blocks, and file segment $300_D$ has 1 LUN block. As shown in FIG. 3, file segments in VMFS volume 302 are converted into LUN blocks by lines connecting file segments 300 to LUN blocks 304 in LUNs 156 where LUNs 156 represent the LUN address space. When storage system 106 is a NAS device, the file segments are managed within the NAS device.

By resolving all file segments $300_A$-$300_D$ making up virtual disk $222_A$ into an ordered list of their corresponding LUN blocks (in the case of FIG. 3, for a total of 10 blocks), VMFS 230 creates a "blocklist" (e.g., a list of <LUN ID, offset, length>) which is representative of virtual disk $222_A$ in LUN block form. As previously discussed in the context of FIG. 1, storage system 106 can utilize the extent maps for LUNs $156_D$-$156_G$ to resolve each of the LUN blocks in the blocklist into its corresponding list of <spindle #, extent #> pairs (spindle-extent pairs) within spindles $152_A$-$152_N$. As shown in FIG. 3, LUN blocks 304 are converted into spindle-extent pairs by lines connecting LUN blocks 304 within LUNs 156 to extents within spindles 152. Extents 153 within spindle $152_A$ are explicitly labeled in FIG. 3. Extents within other spindles 152 are not labeled in FIG. 3. Those with ordinary skill in the art will recognize that, although FIG. 3 has been discussed in the context of a virtualized system in which a virtual disk is allocated into file segments, non-virtualized systems similar to that of FIG. 1B may also have files stored in its file system that exhibit similar types of segmentation into LUN blocks.

As previously discussed, storage devices, such as storage system 106, typically expose LUN block level operations to computer systems communicating with it. For example, a standard raw SCSI read or write operation requires a LUN identifier, logical block address, and transfer length (i.e., similar to the <LUN ID, offset, length> encoding described herein). As such, in order to perform operations on files such as virtual disk $222_A$ that are managed at VMFS 230 file system level, standard raw SCSI operations need to be separately applied to each of the blocks in virtual disk's $222_A$ blocklist. Each I/O communication (e.g., transmission of a raw SCSI operation) by computer system 200 with storage system 106 can take up significant computing resources such as CPU cycles, DMA buffers, and SCSI commands in an HBA queue.

By exposing LUN blocklist level primitives to the set of operations available to computer systems communicating with storage system 106, disk array vendors provide computer systems an ability to offload resource intensive communication with a disk array into the disk array itself. The disk array can then leverage any proprietary hardware optimizations that may be available internally thereto. In one embodiment, such blocklist level primitives may be embedded in a command descriptor block (CDB) in a pre-existing standard command of the communication interface protocol between the computer system and disk array or, alternatively, may be added as an additional command to the set of standard commands. For example, for SCSI supported interactions between a computer system and a disk array, certain blocklist level primitives may be able to be embedded into the CDB of SCSI's pre-existing WRITE BUFFER command, while other blocklist level primitives may require the addition of a new SCSI level command (e.g., with its own CDB) to augment SCSI's current commands. The following discussion presents uses of a SCSI command, extended copy ("XCOPY"), as promulgated by T10 technical committee of the International Committee for Information Technology Standards (INCITS), and as described in the current draft SCSI Primary Commands-3 document (referred to herein as SPC-3). The latest version of the SPC-3 document provides SCSI primary command standards that are designed to be used industry wide.

Figure 4:
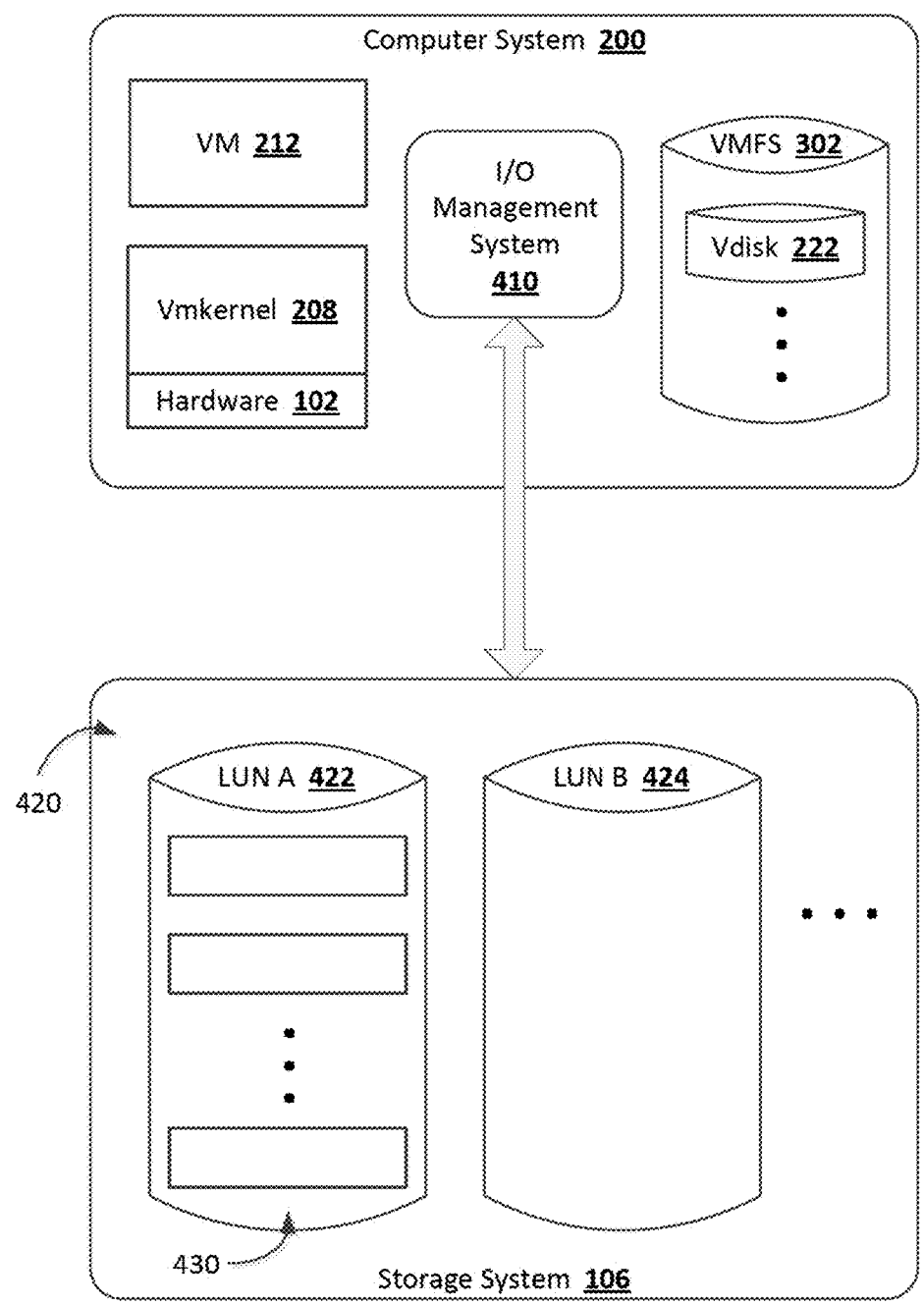

FIG. 4 is a conceptual diagram that shows an I/O management system 410 that may be used to adaptively offload storage data movement operations from computer system 200 to storage system 106. In some embodiments, I/O management system 410 may be logically a part of VM 212 (e.g., executed within the VM) or VMkernel 208 (e.g., executed as a part of or in conjunction with the I/O subsystem of VMkernel 208). In the example embodiment, I/O management system 410 offloads disk operations horn computer system 200 to storage system 106 using SCSI XCOPY operations, as described in greater detail below.

In the example embodiment, storage system 106 is an enterprise-class storage array that includes a plurality of disk drives (e.g., spindles) and a Managing controller such as storage system manager 150 (shown in FIGS. 1B and 2). Storage system 106 may be a SAN (storage area network) storage array or a NAS (network-attached storage) array that supports the SCSI protocol as described herein (e.g., SCSI over Fiber Channel, or SCSI over IP). In some embodiments, storage system 106 may be a simple storage array in which spindles 152. are presented as individual LUNs 420 to computer system 200 (e.g., without any additional layer of abstraction). In other embodiments, LUNs 420 may be disk drives (e.g., spindles 152) directly attached to computer system 200 (e.g., through an internal communications bus, or through an external-facing SCSI controller within hardware 102). In still other embodiments, storage system 106 may he an intermediary storage virtualization device. Some known storage virtualization devices do not themselves physically contain the storage they present to client systems, but rather acts as an I/O gateway between storage clients such as computer system 200 and back end storage arrays such as the enterprise-class storage array described above. Such storage virtualization devices may aggregate LUNs presented from back end storage arrays and present these virtual LUNs as LUNs 420 to computer system 200.

In the example embodiment, storage system 106 includes a plurality of LUNs 420, including LUN A 422 and LUN B 424. In some embodiments, LUNs 42.0 may be similar to LUNs 156 (shown in FIGS. 1B, 2, and 3). In other words, LUNs 420 may be logical constructs presented by storage system 106 that include one or more extents from one or more spindles (e.g., one or more separate disk drives) grouped as a single logical unit. In other embodiments, LUNs 420 may be similar to spindles 152 (shown in FIGS. 1B, 2, and 3). In other words, each individual LUN 420 may be a single spindle 152 (e.g., a single disk drive). Each LUN 420 includes a plurality of blocks 430, referred to herein as "disk blocks." Each disk block represents an individually addressable chunk or segment of a LUN 420 with a fixed size defined by the LUN (e.g., 512 bytes, or 4 kilobytes (k)).

In the example embodiment, I/O management system 410 initiates SCSI XCOPY Operations to 420 to move data within storage system 106. For example, computer system 200 may wish to relocate data between vdisks 222 (e.g., from vdisk $222_A$ to vdisk $222_X$ (shown in FIG. 2)). Such operations may involve, for example, relocation of one or more disk blocks 430 from one LUN 422 to another LUN 424 or relocation of one or more disk blocks 430 within a single LUN 422.

The SCSI XCOPY operation as defined by SPC-3 (operation code "83h") provides at least two copy operations; that in the example embodiment, may be used by I/O management system 410 to offload copy operations from computer system 200 to storage system 106: (1) a "block-to-block" copy operation (descriptor type code "02h") and (2) a "block-to-block with offset" copy operation (descriptor type code "0Ah"). Each of these sub-operations of XCOPY ("sub-copy operations") enable 110 management system 410 to instruct storage system 106 what data to move (e.g., by source) and where to move the data to (e.g., by target).

With the XCOPY "block-to-block" operation, I/O management system 410 specifies a source MIN, a logical address within that LUN, and a number of blocks (i.e., number of "disk blocks") to copy starting at that address (i.e., what data to copy). The I/O management system can also specify, in that same XCOPY operation, the destination LEN and a logical address within that LEN (i.e., where to write the data to). In other words, the XCOPY block-to-block operation copies whole and contiguous blocks of data. Because the size of each disk block is pre-defined and known by both storage system 106 and computer system 200, contiguous blocks of data (e.g., in segments of 512 bytes or 4 k bytes) may be copied by reference to a starting address (e.g. source LEN and logical address within the LUN) and a number of blocks to copy from the starting address.

With the XCOPY "block-to-block with offset" operation, I/O management system 410 specifies a source LUN and a logical address within that LUN, similar to the "block-to-block" operation. However, the "block-to-block with offset" operation also includes a source byte offset that can be used to identify a starting position within a particular disk block (e.g., a number of bytes into that block). In other words, unlike the "block-to-block" operation, this copy with offset operation need not start at the first byte of a disk block, but may instead start at a number of bytes into the specified disk block. Likewise, the destination of the copy need not start at the first byte of a destination disk block. In addition to a destination LUN and logical address within that LUN, the "block-to-block with offset" operation also includes a destination byte offset that can be used to identify a particular byte position within the destination disk block to which writing begins during the copy operation. Further, the amount of data to copy is specified in a number of bytes under the "block-to-block with offset" operation. As such, the "block-to-block with offset" operation is not restricted to operating in segments of a size defined by the LUN.

These two sub-copy operations, "block-to-block" and "block-to-block with offset," are two of the tools used by computer system 200 and/or I/O management system 410 to orchestrate offloading of copy operations from computer system 200 to storage system 106. The particular uses of these operations are described in detail below.

In the example embodiment, I/O management system 410 encounters a variety of situations in which the XCOPY operations are used to copy data. For example, computer system 200 may relocate data between vdisks 222 during a VM migration operation, or may create a full copy of a vdisk 222 during a cloning operation, or during a copy-on-write operation when a SCSI write request is sent to a block that has yet to be allocated, when that block is currently shared between a child disk and the parent disk.

Further, in some embodiments, I/O management system 410 may also transmit the XCOPY operations to many different types of back-end hardware, each of which may exhibit different characteristics such as, for example, performance characteristics, load characteristics, and SCSI compliance characteristics (e.g., whether the back-end hardware supports XCOPY or particular XCOPY features or parameters)

In the example embodiment, I/O management system 410 analyzes performance data for past XCOPY operations ("performance results") and dynamically adjusts the parameters for upcoming XCOPY operations based on historical performance. More specifically, I/O management system 410 collects and tracks performance results for one or more of the "block-to-block" and "block-to-block with offset" and other XCOPY operations for a plurality of ELINs 420 of one or more storage systems 106. In some embodiments, I/O management system 410 identifies performance results (e.g., response times) based on the segment descriptor type. Some storage systems 106 and/or LUNs 420 may only be configured to accept certain XCOPY operations (e.g., "block-to-block") but may not be able to accept others (e.g., "block-to-block with offset"). Further, some storage systems 106 and/or LUNs 420 may perform better with one operation over another, or may perform better with a certain number of parameters. Each of these historical performance results or attributes of LUNs 420 and/or storage system 106 are examples of signals (also referred to herein as "adaptive metrics" types) that may be used by I/O management system 410 to select how to form new XCOPY operations for storage systems 106 and/or LUNs 420.

One type of adaptive metric that may be used by I/O management. system 410 relates to performance of the various types of sub-copy operations (also referred to herein as an "operation-type comparison"). In other Words, I/O management system 410 may identify performance results for a given segment descriptor type management system 410 may track response times for one or more historical "block-to-block" sub-copy operations transmitted to LUN A 422 as well as one or more historical "block-to-block with offset" sub-copy operations transmitted to LUN A 422. For example, average response time may be 5 to 10 milliseconds. Since block-to-block is block-aligned, whereas block-to-block with offset need not be, block-to-block with offset may be slower if partial blocks are being covered. But block-to-block with offset may support a larger segment than block-to-block, so it may be faster for a big extent.

Another type of adaptive metric that may be used by I/O management system 410 relates to performance of operations based on the quantity or quality of parameters for each type of XCOPY operation. More specifically, for XCOPY operations, SCSI SPC-3 provides a mechanism to submit several copy operations together in a single SCSI message. A command descriptor block (CDB) (e.g., with operation code "83h", extended copy) accepts a variable length list of parameters. The parameter list includes both a list of targets (i.e., a list of source and destination LUNS for the copy operations) as well as a list of one or more segment descriptors. Each segment descriptor represents an individual sub-copy operation, the structure of which differs based on the type of sub-copy operation specified by the descriptor type code (e.g., "02h" for "block-to-block" and "0Ah" for "block-to-block with offset"). As such, each CDB may specify multiple sub-copy operations (e.g., multiple segment descriptors) within a single XCOPY operation. Further, each storage system 106 and/or LUN 420 may support only up to a maximum number of sub-copy operations within a single XCOPY operation.

Accordingly, in some embodiments, the 110 management system 410 may collect and compare performance characteristics (e.g., performance results) of XCOPY operations based on how many sub-copy operations (e.g., number of segment descriptors) are submitted to one or more LUNs 420 or storage systems 106 within individual XCOPY operations. In some embodiments, these performance results may be grouped and/or evaluated for XCOPY operations of a particular segment descriptor type. Some storage systems 106 and/or LUNs 420 may perform better with fewer sub-copy operations within each XCOPY operation (e.g., more XCOPY operations, overall), while others may exhibit better performance with a greater number of sub-copy operations within each XCOPY operation (e.g., less XCOPY operations, overall).

Further, the 110 management system 410 may compare performance characteristics of XCOPY operations based on the amount of data being copied (e.g., the total byte count of a sub-copy operation, or the total byte count of all sub-copy operations within an XCOPY operation). In some embodiments, I/O management system 410 weights the performance response times of each XCOPY or sub-copy operation based on their total size. For example, if a first sub-copy operation of 4 k bytes completes within 5 ms (milliseconds), and a second sub-copy operation of 16 k bytes completes within 7 ms, each response time may be altered based on size (e.g., divided by the size) and subsequently used to determine actions. In other embodiments, one or more averages may be maintained based on, for example, the number of descriptors, the type of descriptor, and the maximum size per descriptor. Block-to-block may be limited to a maximum transfer size, so anything more than that would need to use block-to-block with offset. Block-to-block with offset may perform best at a maximum transfer size (e.g., 40 megabytes), thus several may need to be used. Depending on the total data size to be moved, which descriptor and the number of descriptors may be determined base on one or more of these averages.

In some embodiments, performance results of the various operation types described herein is measured in response time, for example, the time between submission of an XCOPY operation to a LUN 420 or a storage system 106 and the time of completion. XCOPY is a regular SCSI command which includes a SCSI command response once the copy finishes. The operating system keeps track of every outstanding command and receives a notification when the response arrives. As such, a measure of the time between issue and response (e.g., latency) may be computed and used.

Individual LUNs may respond slower or faster than others. As such, determining how each of two different LUNs impacted the latency of an XCOPY operation (e.g., an operation involving two different LUNs) may be difficult. In some embodiments, per-LUN statistics may be tracked for regular read/write SCSI commands. These per-LUN statistics may be used to apply a bias and "split" XCOPY latency results between two LUNs in an XCOPY operation.

In some embodiments, I/O management system 410 may consider system performance data from computer system 200 when forming XCOPY operations. I/O management system 410 may collect data such as, for example, central processing unit (CPU) load data for a processor, or I/O controller data for the controllers that communicate with storage system 106, or I/O metric data associated with storage system 106 or LUNs 420, or fragmentation within file systems stored on storage system 106. Any one or more of these metrics may influence how I/O management system 410 builds XCOPY operations. For example, if a file system is fragmented (e.g., having a first fragmentation length non-contiguous to a second fragmentation length), I/O management system 410 may select a segment descriptor type based on the length of each contiguous extent that to be moved (e.g., the first fragmentation length and the second fragmentation length). For another example, when computer system 200 is determined to be heavily CPU-loaded, such as over a pre-defined threshold value, I/O management system 410 may select a segment descriptor type that can maximize the amount of contiguous data that is copied in a single XCOPY operation in order to avoid n more burden on the CPU.

I/O management system 410 may weigh one or more of these additional factors (e.g., system performance data) against other above-described considerations such as, for example, the performance tendencies toward segment descriptor types. For example, I/O management system 410 may compare CPU load of computer system 200 and the performance preference of storage system 106 toward, for example, whole-block copies rather than block-to-block with offset. I/O management system 410 may determine to override the performance preference of the storage system 106 and, instead, select the XCOPY operation that would most benefit (e.g., least negatively impact) CPU performance, or vice versa. For example, if the CPU is 95% busy, an XCOPY operation may be formed with a segment descriptor length which exceeds an optimal value in order to avoid additional CPU burden on forming additional XCOPY commands.

In the example embodiment, I/O management system 410 collects performance data associated with XCOPY operations for storage system 106 and/or LUNs 420 over the normal course of operation of computer system 200. I/O management system 410, thus, dynamically determines and/or converges upon the better-performing XCOPY operational preferences of the various LUNs 420 of storage system 106, and/or of storage system 106 itself. In other embodiments, I/O management system 410 systematically tests and determines the better-performing XCOPY operational preferences. In one embodiment, I/O management system 410 performs a series of XCOPY operations on LUN A 422 in a round robin manner between segment descriptor types. I/O management system 410 forms the XCOPY operations by varying the operational parameters of the XCOPY operations, submitting various permutations of the operational parameters to determine which parameters (e.g., segment descriptor type, number of segment descriptors, size of copies) work best with LUN A 422.

For example. I/O management system 410 may submit a whole-block copy operation of 10 blocks, 100 blocks, and 1,000 blocks, or in fixed increments of blocks such as in 10 block increments, comparing each result to determine which performs best for that particular LUN (e.g., LUN A 422). For another example, I/O management system 410 may submit XCOPY operations with increasing numbers of sub-copy operations (e.g., numbers of segment descriptors) until no more performance gain is realized or detected. As such, I/O management system 410 can systematically test a variety of operational parameter sets to determine, for example, which segment descriptor type and/or number of segment descriptors perform best for the given LUN or storage array. This approach enables I/O management system 410 to adjust based on actual response values of storage system 106 and/or LUNs 420, and without prior knowledge of the underlying storage hardware, its performance tendencies, or its protocol limitations.

In some embodiments, the XCOPY operations described herein may be used to offload data movement operations when migrating VMs between LUNs. During such operations, substantial amounts of data may need to be moved. Further, these XCOPY operations may be used for VM provisioning and VIM imaging solutions, which may also require large amounts of data to be replicated. As such, the offloading of these copy operations, and the tuning of the performance of these operations, enable one or more of increased performance,. reduced CPU burden, reduced burden on the storage array and storage network, and reduced copy time.

Figure 5:
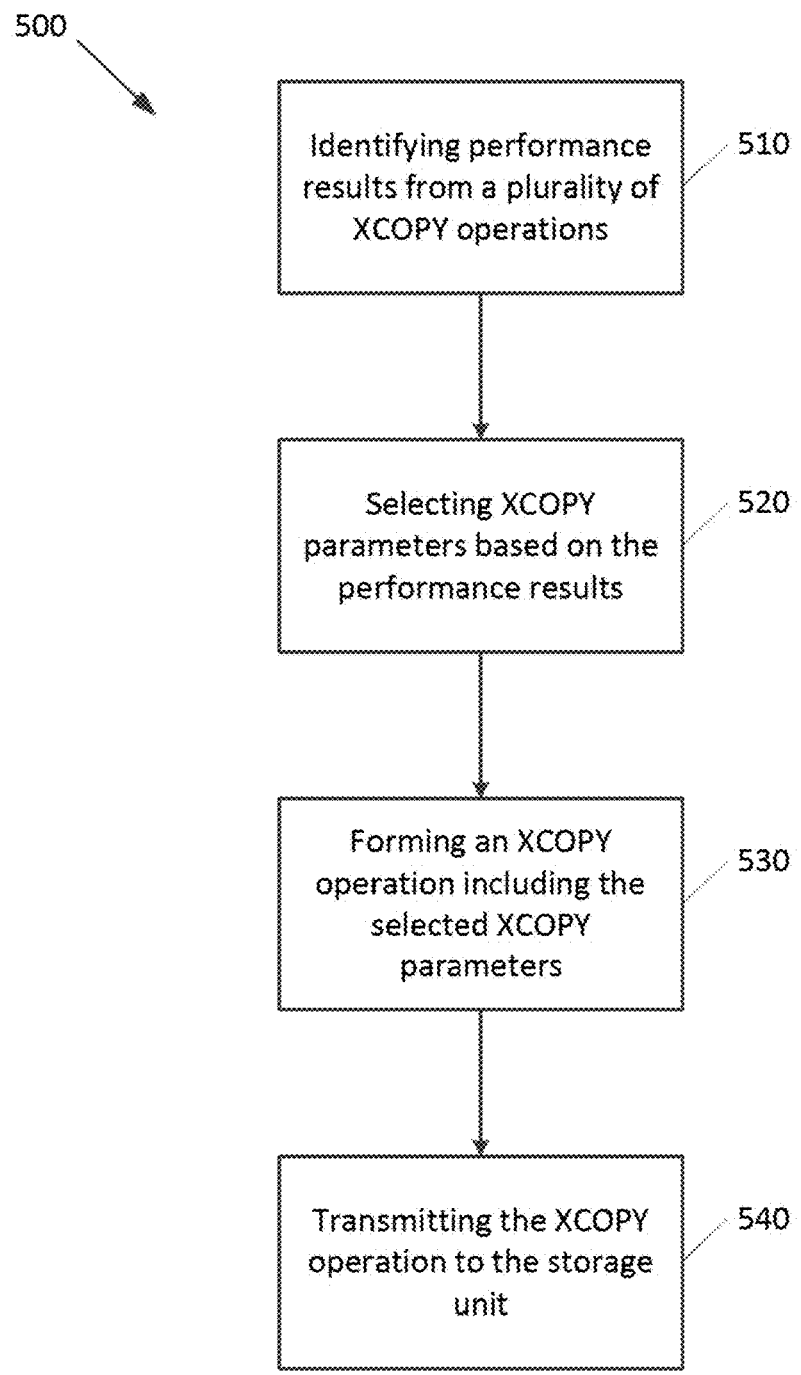

FIG. 5 is a flow diagram of an example method 500 for adaptively offloading storage data movement operations from a computer system similar to computer system 200 (shown in FIG. 4) to a storage system similar to storage system 106 (shown in FIG. 4). In some embodiments, method 500 is performed by a computing device including a processor and a memory. In the example embodiment, method 500 includes identifying 510 performance results from a plurality of SCSI extended copy (XCOPY) operations associated with a storage unit, each XCOPY operation of the plurality of XCOPY operations including one or more parameters. In some embodiments, identifying 510 performance results includes identifying response times for each XCOPY operation of the plurality of XCOPY operations, wherein selecting one or more XCOPY parameters includes comparing the response times.

In the example embodiment, method 500 includes selecting 520, based on the identified performance results, one or More XCOPY parameters for the storage unit from the plurality of XCOPY operations. In some embodiment, selecting 520 one or More XCOPY parameters includes selecting one or more of a Segment descriptor type and a number of blocks. In other embodiments, selecting one or more XCOPY parameters includes selecting a quantity of sub-copy operations within a single XCOPY operation. In still other embodiments, the storage unit includes one or more logical storage units, and selecting 520 one or more XCOPY parameters for the storage unit includes selecting one or more XCOPY parameters for a logical storage unit of the one or more logical storage units.

Method 500, in the example embodiment, also includes forming 530 an XCOPY operation associated with the storage unit, the XCOPY operation including the one or more selected XCOPY parameters. In some embodiments, forming 530 an XCOPY operation includes forming an XCOPY operation including a first and second sub-copy operation, wherein the first and second sub-copy operations have different segment descriptor types. Method 500 may also include determining that the storage unit supports a first segment descriptor type code and a second segment descriptor type code. In some embodiments, method 500 also includes identifying system performance data of the first computer system, wherein forming an XCOPY operation further includes overriding at least one of the one or more XCOPY parameters based at least in part on the system performance data. In the example embodiment, method 500 includes transmitting 540 the XCOPY operation to the storage unit.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, Microprocessor-based or programmable consumer electronics, minicomputers, mainframe computers, and the like.

In one embodiment, a computer program is provided, and the program is embodied on a computer readable medium. In an example embodiment, the system is executed on a single computer system, without requiring a connection to a server computer. In a further embodiment, the system is being run in a vSphere® environment (vSphere is a registered trademark of VMware, Inc., of Palo Alto, Calif.) with one or more physical servers hosting a plurality of virtual machines "VM's"). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

One Or more embodiments of the present invention may be implemented as One or more computer program is or as one or more computer program module embodied in one or more computer readable media. The term computer readable Medium refers to any data storage device that can store data Which can thereafter be input to a computer system—computer readable media may be based on any existing or subsequently developed technology for embodying computer programs in a manner that enables them to be read by a computer. Examples of a computer readable medium include a hard drive, network attached storage (AS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion. The "computer-readable medium," however, do not include transitory signals.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that VMs present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and. functionality presented as a single component may be implemented as separate components. These and other variations, modifications, additions, and improvements may fall within the scope of the appended claims(s).

What is claimed is:

1. A method for adaptive offloading of data movement from a computer system, the method comprising:
   identifying response times from a plurality of historical SCSI extended copy (XCOPY) operations associated with a storage unit, each XCOPY operation of the plurality of XCOPY operations including one or more parameters;
   selecting, based on the identified response times, one or more XCOPY parameters for the storage unit from the plurality of XCOPY operations;
   forming a new XCOPY operation associated with the storage unit, the new XCOPY operation including the one or more selected XCOPY parameters; and
   transmitting the new XCOPY operation to the storage unit.

2. The method of claim 1, wherein identifying response times further includes identifying response times based on segment descriptor type.

3. The method of claim 1, wherein identifying response times further includes identifying response times based on the number of segment descriptors within each XCOPY operation of the plurality of XCOPY operations having a first segment descriptor type.

4. The method of claim 1 further comprising:
   identifying processor (CPU) load data of the first computer system; and
   determining that the CPU load data is above a pre-defined threshold, wherein forming an XCOPY operation further includes selecting a segment descriptor type based on maximizing a size of contiguous data that is copied in the XCOPY operation.

5. The method of claim 1 further comprising identifying fragmentation within the computer system, the fragmentation including a plurality of fragmentation lengths, wherein selecting one or more XCOPY parameters further includes selecting a segment descriptor type based on the plurality of fragmentation lengths.

6. The method of claim 1, wherein identifying response times further comprises:
   forming the plurality of XCOPY operations by selecting descriptor types in a round robin manner; and
   identifying a segment descriptor type based at least in part on the response times.

7. The method of claim 1, wherein identifying response times further comprises forming the plurality of XCOPY operations by successively increasing the number of segment descriptors within each subsequent XCOPY operation until no more performance gain is detected.

8. The method of claim 1, wherein forming an XCOPY operation includes forming an XCOPY operation including a first and second sub-copy operation, wherein the first and second sub-copy operations have different segment descriptor types.

9. The method of claim 8 further comprising determining that the storage unit supports a first segment descriptor type code and a second segment descriptor type code.

10. A computing device for adaptive offloading of data movement from a first computer system, said computer device comprising a processor communicatively coupled to an input/output (I/O) controller, said computing device programmed to:

identify response times from a plurality of historical SCSI extended copy (XCOPY) operations associated with a storage unit, each XCOPY operation of the plurality of XCOPY operations including one or more parameters;

select, based on the identified response times, one or more XCOPY parameters for the storage unit from the plurality of XCOPY operations;

form a new XCOPY operation associated with the storage unit, the XCOPY operation including the one or more selected XCOPY parameters; and transmit the new XCOPY operation to the storage unit.

11. The computing device of claim 10, wherein the processor is further programmed to identify response times based on segment descriptor type.

12. The computing device of claim 10, wherein the processor is further programmed to identify response times based on the number of segment descriptors within each XCOPY operation of the plurality of XCOPY operations having a first segment descriptor type.

13. The computing device of claim 10, wherein the processor is further programmed to:

identify processor (CPU) load data of the first computer system; and determine that the CPU load data is above a pre-defined threshold, wherein forming an XCOPY operation further includes selecting a segment descriptor type based on maximizing a size of contiguous data that is copied in the XCOPY operation.

14. The computing device of claim 10, wherein the processor is further programmed to identify fragmentation within the computer system, the fragmentation including a plurality of fragmentation lengths, wherein selecting one or more XCOPY parameters further includes selecting a segment descriptor type based on the plurality of fragmentation lengths.

15. The computing device of claim 10, wherein the processor is further programmed to:

form the plurality of XCOPY operations by selecting descriptor types in a round robin manner; and identify a segment descriptor type based at least in part on the response times.

16. The computing device of claim 10, wherein the processor is further programmed to form the plurality of XCOPY operations by successively increasing the number of segment descriptors within each subsequent XCOPY operation until no more performance gain is detected.

17. The computing device of claim 10, wherein the processor is further programmed to form an XCOPY operation including a first and second sub-copy operation, wherein the first and second sub-copy operations have different segment descriptor types.

18. The computing device of claim 17, wherein the processor is further programmed to determine that the storage unit supports a first segment descriptor type code and a second segment descriptor type code.

19. A computer-readable storage medium having computer-executable instructions embodied thereon, wherein, when executed by at least one processor, the computer-executable instructions cause the at least one processor to:

identify response times from a plurality of historical SCSI extended copy (XCOPY) operations associated with a storage unit, each XCOPY operation of the plurality of XCOPY operations including one or more parameters;

select, based on the identified response times, one or more XCOPY parameters for the storage unit from the plurality of XCOPY operations;

form a new XCOPY operation associated with the storage unit, the XCOPY operation including the one or more selected XCOPY parameters; and transmit the new XCOPY operation to the storage unit.

20. The computer-readable storage medium of claim 19, wherein the computer-executable instructions further cause the processor to identify response times based on segment descriptor type.

21. The computer-readable storage medium of claim 19, wherein the computer-executable instructions further cause the processor to identify response times based on the number of segment descriptors within each XCOPY operation of the plurality of XCOPY operations having a first segment descriptor type.

22. The computer-readable storage medium of claim 19, wherein the computer-executable instructions further cause the processor to:

identify processor (CPU) load data of the first computer system; and determine that the CPU load data is above a pre-defined threshold, wherein forming an XCOPY operation further includes selecting a segment descriptor type based on maximizing a size of contiguous data that is copied in the XCOPY operation.

23. The computer-readable storage medium of claim 19, wherein the computer-executable instructions further cause the processor to identify fragmentation within the computer system, the fragmentation including a plurality of fragmentation lengths, wherein selecting one or more XCOPY parameters further includes selecting a segment descriptor type based on the plurality of fragmentation lengths.

24. The computer-readable storage medium of claim 19, wherein the computer-executable instructions further cause the processor to:

form the plurality of XCOPY operations by selecting descriptor types in a round robin manner; and identify a segment descriptor type based at least in part on the response times.

25. The computer-readable storage medium of claim 19, wherein the computer-executable instructions further cause the processor to form the plurality of XCOPY operations by successively increasing the number of segment descriptors within each subsequent XCOPY operation until no more performance gain is detected.

26. The computer-readable storage medium of claim 19, wherein the computer-executable instructions further cause the processor to form an XCOPY operation including a first and second sub-copy operation, wherein the first and second sub-copy operations have different segment descriptor types.

27. The computer-readable storage medium of claim 26, wherein the computer-executable instructions further cause the processor to determine that the storage unit supports a first segment descriptor type code and a second segment descriptor type code.

* * * * *